United States Patent [19]

Takegami

[11] Patent Number: 5,059,327
[45] Date of Patent: Oct. 22, 1991

[54] CROSS-LINKED SEPARATION MEMBRANE AND PROCESS FOR PERVAPORATION

[75] Inventor: Shinsuke Takegami, Ohtsu, Japan

[73] Assignee: Director-General, Agency of Industrial Science and Technology, Tokyo, Japan

[21] Appl. No.: 89,180

[22] Filed: Aug. 25, 1987

[30] Foreign Application Priority Data

Aug. 26, 1986 [JP] Japan .................................. 61-198044

[51] Int. Cl.⁵ .......................... B01D 3/00; B01D 13/00
[52] U.S. Cl. ........................ 210/500.34; 210/500.42; 210/500.43; 210/640; 159/DIG. 27; 159/DIG. 28; 203/14; 203/15; 203/16; 203/18; 203/19; 568/916
[58] Field of Search ...................................... 203/14–19, 203/99, 89, 72, 91, 39, DIG. 13, 41; 159/DIG. 27, DIG. 28, 49; 210/500.42, 640, 638, 500.43, 500.34; 568/916

[56] References Cited

U.S. PATENT DOCUMENTS

| | | | |
|---|---|---|---|
| 3,737,045 | 6/1973 | Hashimoto et al. | 210/500.34 |
| 3,808,305 | 3/1974 | Gregor | 210/500.34 |
| 4,046,843 | 9/1977 | Sano et al. | 210/500.34 |
| 4,250,029 | 2/1981 | Kiser et al. | 210/500.34 |
| 4,432,875 | 2/1984 | Wrasidlo et al. | 210/500.34 |
| 4,619,767 | 10/1986 | Kamiyama et al. | 210/500.42 |
| 4,737,325 | 4/1988 | Kamiyama et al. | 210/500.42 |
| 4,755,299 | 7/1988 | Bruschke | 210/640 |
| 4,775,474 | 10/1988 | Chau et al. | 210/500.34 |

FOREIGN PATENT DOCUMENTS

58-205503 11/1983 Japan .............................. 210/500.34

Primary Examiner—Wilbur Bascomb, Jr.
Attorney, Agent, or Firm—Wegner, Cantor, Mueller & Player

[57] ABSTRACT

A preparation membrane for pervaporation which comprises a crosslinked reaction mixture of a polyvinyl alcohol or polyvinyl alcohol copolymer and a polystyrene sulfonic acid or polystyrene sulfonic acid copolymer. A method for separating a mixture of water and an organic compound by using the membrane is also disclosed.

15 Claims, 2 Drawing Sheets

TRANSMITTANCE (%)

WAVE NUMBER (cm⁻¹)

CROSS-LINKED SEPARATION MEMBRANE AND PROCESS FOR PERVAPORATION

FIELD OF THE INVENTION

The present invention relates to a separation membrane for pervaporation. Further, the present invention relates to a method for separating water from a liquid mixture of water and an organic compound by pervaporation using the separation membrane.

BACKGROUND OF THE INVENTION

As a method for separating a liquid mixture of water and an organic compound, a distillation method has been known for a long time. However, it is very difficult to separate an azeotropic mixture, a mixture of compounds having close boiling points, or a compound which is liable to be denatured by distillation. Further, even if compounds are separable by distillation, they often require a large amount of energy. In order to solve these problems in a distillation method, various separation methods using polymer membranes have been studied. Among them, pervaporation is considered to be useful for separation of a liquid mixture of water and an organic compound. Pervaporation is a separation method wherein a liquid mixture to be separated is fed to one side of a polymer membrane, while the other side of the membrane is evacuated or maintained at a reduced pressure to preferentially withdraw a permeate in vapor form through the membrane.

The study of this method has been started in the 1950's and, for example, pervaporation has been already disclosed in U.S. Pat. No. 2,953,502 to Binning. One characteristic of this pervaporation is to make possible to separate, concentrate and purify an azeotropic mixture, a mixture of compounds having close boiling points, a heat decomposable mixture or the like which is difficult to treat by a conventional distillation method. Another characteristic of pervaporation is that it is not limited to a water soluble organic liquid mixture as in reverse osmosis, but it is generally applicable to a wide variety of organic liquid mixtures. Recently, various studies of this method have been specifically made and there are many reports relating to polymer membranes to be used in the method.

For example, regarding separation of an aqueous ethanol solution, U.S. Pat. No. 2,953,502 discloses a cellulose acetate homogeneous membrane and U.S. Pat. No. 3,035,060 discloses a polyvinyl alcohol membrane. However, both membranes have low separation factors. Although Japanese Patent Kokai No. 59-109204 discloses a composite membrane having a cellulose acetate membrane or a polyvinyl alcohol membrane as a skin layer and Japanese Patent Kokai No. 59-55305 discloses a polyethylene imine crosslinked composite membrane, their permeation rates or separation factors are low. In Japanese Patent Kokai No. 60-129104, there is described a membrane comprising an anionic polysaccharide. However, the material used for the membrane described in the Examples of this literature is a water soluble polymer and therefore durability of the membrane against an aqueous solution containing a low concentration of an organic compound is inferior. Then, in this literature, there is also described that the membrane is subjected to a crosslinking treatment with a sufficient amount of a crosslinking agent to render the membrane essentially insoluble in water, although it is not disclosed in the Examples thereof. However, usually, when a crosslinking treatment is effected, a permeation rate is decreased, while a separation factor is increased as shown by Comparative Examples hereinafter. In German Patent No. 3220570, although there is disclosed that a composite membrane obtained by coating a polymer of polyvinyl alcohol crosslinked with maleic acid on a polyacrylonitrile porous membrane shows very high separability, the permeation rate thereof is very low.

When separation of an organic liquid mixture is carried out by using these membranes, there are problems in practice as follows.

That is, since separation efficiency is low, desired concentration or separation can not be attained by permeation once through a polymer membrane. Therefore, a multi-stage operation is required, or it is necessary to combine pervaporation with another separation method, which causes trouble in practice. Further, an amount of an organic compound permeating through a polymer membrane (expressed by the amount of the permeate per unit membrane area, unit membrane thickness and unit time) is very small and, therefore, it is necessary to make the membrane area much larger, or to extremely thin the membrane thickness. In the former case, a larger apparatus is required for industrial practice, which increases cost of facilities. In the latter case, strength and durability of a membrane are lowered, which causes trouble in practice.

In order to solve these problems, various attempt have been made, but not yet been successful.

OBJECTS OF THE INVENTION

The present invention is to solve problems in separation of water from a liquid mixture of water and an organic compound by pervaporation, that is, such problems that both permeation rate and separation factor can not be increased simultaneously in a conventional separation membrane.

That is, one object of the present invention is to provide a separation membrane for pervaporation having both high permeation rate and high separation factor.

Another object of the present invention is to provide a method for separating water from a liquid mixture of water and one or more organic compounds.

These objects as well as other objects and advantages of the present invention will become apparent to those skilled in the art from the following description with reference to the accompanying drawings.

SUMMARY OF THE INVENTION

Figure 1:
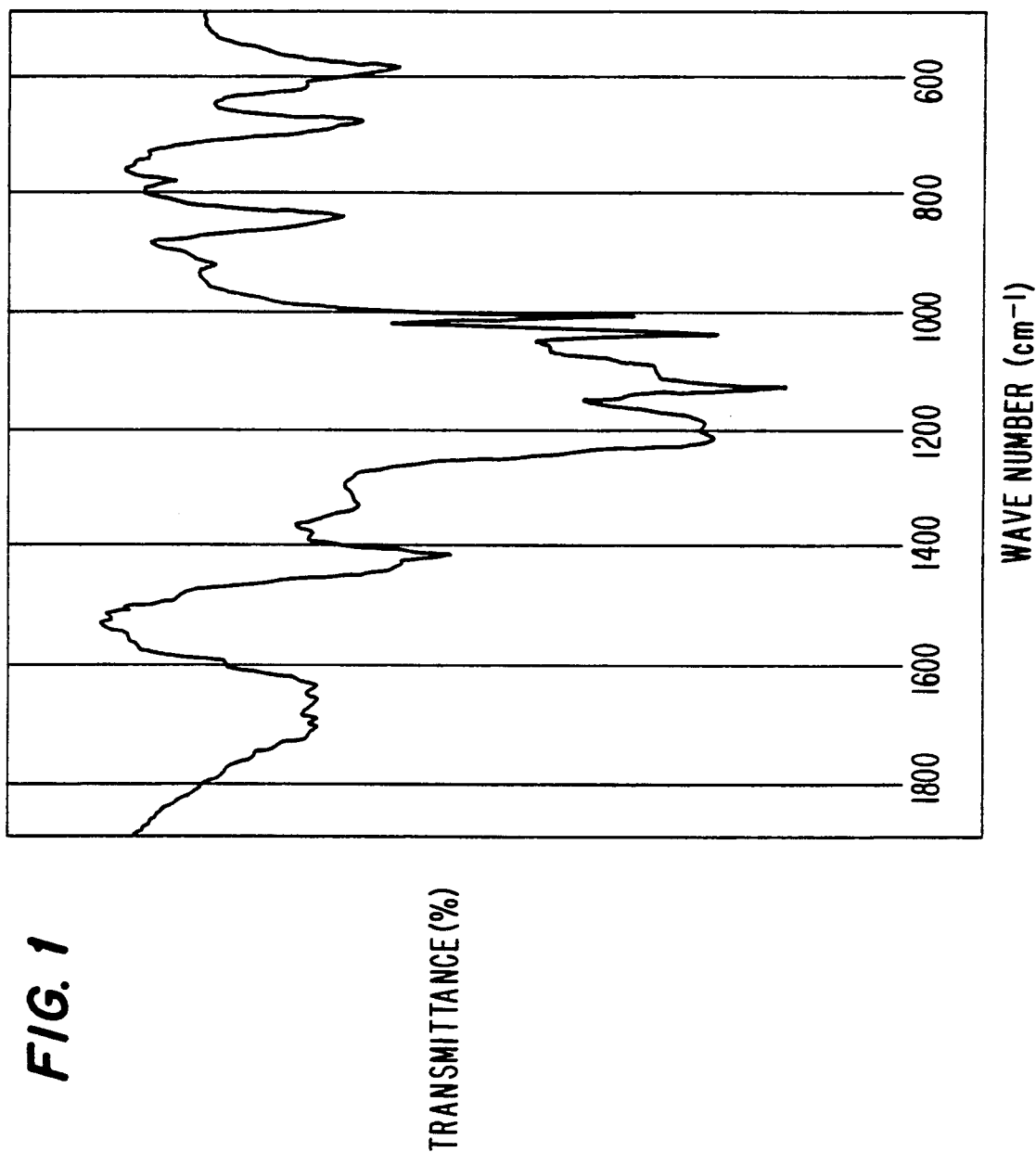
FIG. 1 is an infrared absorption spectrum of one embodiment of a separation membrane according to the present invention before subjecting it to heat treatment for crosslinking.

The present inventor has studied intensively to obtain a separation membrane for pervaporation which has both high separability and high permeability, while maintaining good membrane forming ability and high membrane strength. As the result, it has been found the following separation membrane is suitable for this purpose.

Thus, according to the present invention, there is provided a separation membrane for pervaporation which comprises a crosslinked reaction mixture of a polyvinyl alcohol or polyvinyl alcohol copolymer and a polystyrene sulfonic acid or polystyrene sulfonic acid copolymer.

The present invention also provides a method for separating a mixture of water and an organic compound which comprises the steps of (a) contacting one side of the separation membrane of the present invention with a liquid feed mixture containing water and at least one organic compound; and (b) withdrawing from the other side of said membrane a permeate in a vapor state, said permeate containing water in a concentration higher than that in the feed mixture.

DETAILED DESCRIPTION OF THE INVENTION

The permeation rate used herein means the amount of a permeate per unit membrane area per unit time and expressed by the unit of $kg/m^2 \cdot hr$. On the other hand, the separation factor ($\alpha$) is the ratio of the proportion of water to an organic compound in the feed mixture, to that in the permeate in vapor form. That is, $\alpha = (X/Y)p/(X/Y)f$, wherein X and Y are compositions of water and an organic compound in a two-component system, respectively: and p and f represent the permeate and the feed mixture, respectively.

In order to further illustrate the present invention in detail, a mechanism of separation of liquid by pervaporation is set forth hereinafter. That is, the mechanism of separation of liquid by pervaporation is said to be dissolution and diffusion of liquid in a membrane.

Generally, a separation factor $\alpha_{AB}$ which is a value obtained by dividing a weight ratio of A component to B component after permeation through a membrane by that before permeation can be expressed by the product of a ratio of solubilities of A and B components to the membrane and a ratio of diffusion rates of A and B components in the membrane. Therefore, in order to increase the separation factor $\alpha_{AB}$, it is necessary to increase either or both of the solubility ratio and the ratio of diffusion rates of A and B components.

The solubility is mainly determined by interaction between permeate molecules and a membrane (chemical miscibility). As a measure of chemical miscibility between a material constituting a membrane and a material to be separated, a solubility parameter is taken. Upon choosing a material constituting a membrane, it is preferred to choose a material having high chemical miscibility or similar polarity to a material to be separated. And, it is said that, in the case that a material to be separated (permeate molecules) is hydrophilic, a material constituting a membrane having a high solubility parameter and high polarity is suitable and, in the case that a material is not hydrophilic, a material constituting a membrane having reverse properties is suitable.

The diffusion rate is determined by shape, size and an agglomeration state of permeate molecules, and a free volume of a membrane. In order to increase a separation factor $\alpha_{AB}$, shape of permeate molecules in a feed mixture should be largely different. In general, a smaller molecule has a larger diffusion rate. However, when a given material to be separated is fixed, it is difficult to increase a diffusion rate $\alpha_{AB}$ by difference in shape of permeate molecules. On the other hand, a free volume of a membrane is defined by molecular spacings in the sense of a molecular measure, although it is not macroscopic holes. When a low molecular weight material which makes molecular motion of a high molecular weight material vigorous is contained, a free volume of a membrane becomes larger, which facilitates permeation. In a membrane having a larger free volume, difference between diffusion rates due to difference in size of permeate molecules becomes smaller, whereas, in a membrane having a smaller free volume, difference between diffusion rates due to difference in size of permeate molecules becomes larger. In order to increase a separation factor by utilizing size of permeate molecules, a free volume of a membrane should be small. In order to make a free volume of a membrane smaller, there is employed such a method as introduction of a crosslinking structure or crystalline structure to form three dimensional network.

According to the present inventor's study on various membranes for separation of an aqueous solution containing a water soluble organic compound, particularly, ethanol by pervaporation, it has been found that a separation membrane which is obtained by adding polystyrene sulfonic acid to polyvinyl alcohol having a large solubility parameter, i.e., strong hydrophilic nature, and subjecting the mixture to heat treatment to effect intermolecular crosslinking reaction between the hydroxy group of polyvinyl alcohol and the sulfonic acid group of polystyrene sulfonic acid can selectively separate the alcohol from the water-alcohol mixture, and the membrane has sufficient durability as well as high permeation rate and separation factor throughout a wide concentration range of the alcohol. The sulfonic acid group of the above reaction mixture may be introduced as a sulfonate group.

As the polyvinyl alcohol copolymer used in the present invention, there can be used copolymers of polyvinyl alcohol and other polymers such as polyethylene, polyvinyl acetate, polymethyl acrylate, polystyrene, polyacrylonitrile, polyacrylic acid and the like. However, in the present invention, preferably, polyvinyl alcohol is used. As the polystyrene sulfonic acid copolymer, there can be used copolymers of polystyrene sulfonic acid and other polymers such as polyacrylonitrile, polyvinyl chloride, polymethyl acrylate, polyacrylic acid and the like. However, in the present invention, preferably, polystyrene sulfonic acid is used.

The separation membrane of the present invention can be prepared by, for example, dissolving polyvinyl alcohol or the polyvinyl alcohol copolymer, and polystyrene sulfonic acid or the polystyrene sulfonic acid copolymer in water or an aqueous solution containing a water soluble organic compound such as an alcohol or the like and casting the solution on a porous supporting material, for example, an ultrafiltration membrane. Drying and heat treatment are carried out, simultaneously to effect intermolecular crosslinking to form a coat layer on the porous supporting material a crosslinked reaction mixture of the polyvinyl alcohol or polyvinyl alcohol copolymer and the polystyrene sulfonic acid or polystyrene sulfonic acid copolymer. The heat treatment is carried out at a temperature in the range of 80° to 200° C., preferably, 100° to 150° C. The mixing ratio of polyvinyl alcohol and polystyrene sulfonic acid is in the range of, preferably, 1 to 10 parts by weight, more preferably, 1.5 to 5 parts by weight of polyvinyl alcohol per 1 part by weight of polystyrene sulfonic acid.

The porous supporting material that having micropores of several tens to several thousands Å on its surface. Examples thereof include porous supporting material made of known materials such as polysulfone, polyether sulfone, polyacrylonitrile, cellulose esters, polycarbonate, polyvinylidene fluoride and the like. The porous supporting material may be in any shape, for example, it may be flat membrane, tubular membrane, hollow fiber membrane and the like.

Preferably, the coat layer composed of the thin film of the crosslinkable film is as thin as possible so far as it is pinhole free. The thickness of the coat layer is 0.05 to 5 $\mu m$, preferably, 0.1 to 1 $\mu m$. In order to thin the thickness of the coat layer, it is necessary to decrease the solids content of the solution applied on the porous supporting material, or the thickness of the coated film. The solids content is, preferably, 1 to 15% by weight, more preferably, 5 to 10% by weight. In order to thin the thickness of the film, it is necessary to choose a suitable coating method. In order to form a uniform pinhole free film, the solution is preferably applied on the porous supporting material with a bar coating machine, a spin coating machine and the like.

In the membrane thus produced, OH group of polyvinyl alcohol and $SO_3H$ group of polystyrene sulfonic acid are reacted to form intermolecular crosslinking. Formation of crosslinking can be confirmed by solubility of the membrane in a mixture to be separated or the infrared absorption spectrum of the membrane. When crosslinking is not formed, the membrane is dissolved during separation operation. A partially remaining sulfonic acid group is neutralized with a base to convert into a sulfonate. Examples of the counter cation of the sulfonate include alkali metals, alkaline earth metals, transition metals and ammonium ions of the formula $R_4N^+$ wherein R is hydrogen or alkyl. Preferably, it is an alkali metal, particularly, sodium.

The membrane thus formed is mainly used for separation of a mixture of water and one or more organic compounds, for example, an aqueous solution containing one or more organic compounds selected from the group consisting of alcohols such as methanol, ethanol, 1-propanol, 2-propanol, n-butanol and the like; ketones such as acetone, methyl ethyl ketone and the like; ethers such as tetrahydrofuran, dioxane and the like organic acids such as formic acid, acetic acid and the like aldehydes such as formaldehyde, acetaldehyde, propionaldehyde and the like; and amines such as pyridine, picoline and the like. Further, the membrane can be used for separation of a gaseous mixture of water and these organic compounds.

According to the present invention, separation can be carried out by the steps of (a) contacting one side of the separation membrane of the present invention with a liquid feed mixture containing water and at least one organic compound; and (b) withdrawing from the other side of said membrane a permeate in a vapor state.

These operations per se can be carried out according to a known method.

By using the membrane of the present invention, separation of an organic liquid mixture throughout a wide concentration range can be efficiently carried out at a large permeation rate with maintaining a separation factor higher than that of a known separation method using a conventional membrane. Thereby, a compact and rational separation system can be realized and it is possible to improve the ability of treatment and decrease in cost. Thus, according to the present invention, a membrane separation method is practically applicable for reducing operation steps and saving energy in separation and purification processes in chemical industries.

The following Comparative Examples and Examples further illustrate the present invention in detail but are not to be construed to limit the scope thereof.

The Determination of Pervaporation

The following pervaporation experiments were carried out by maintaining one side of a membrane to which a mixture of water and a water soluble organic compound was fed at atmosphere pressure and the other permeate side at reduced pressure not more than 0.3 mmHg. The active surface of the membrane was directed to the feed side and the feed mixture was added on the surface and stirred at a constant temperature. At this time, effective membrane area was 15.2 cm². Water and the organic compound permeated through the membrane were collected by condensation with liquid nitrogen. n-Propanol was added to the permeate as an internal standard and a permeation rate and a separation factor were determined by TCD gas chromatography. By the way, the separation factor of water to ethanol $\alpha_{EtOH}^{H2O}$ is defined as follows:

$$\alpha_{EtOH}^{H2O} = \frac{Y_{H2O}/Y_{EtOH}}{X_{H2O}/X_{EtOH}}$$

wherein $X_{EtOH}$ and $X_{H2O}$ are ethanol and water contents (% by weight) in the feed mixture, respectively; and $Y_{EtOH}$ and $Y_{H2O}$ are ethanol and water contents (% by weight) in the permeate.

COMPARATIVE EXAMPLE 1

Polyvinyl alcohol having a polymerization degree of 2,000 (7 g) was dissolved in water (93 g) at 80° C. After cooling to room temperature, the solution was applied on an ultrafiltration membrane composed of polyacrylonitrile with a spin coating machine. The coated ultrafiltration membrane was dried at 40° C. for 1 hour and then subjected to heat treatment at 120° C. for 2 hours. The pervaporation ability in aqueous 95% (w/w) ethanol solution of the membrane thus obtained was such that the permeation rate was 0.02 kg/m²·hr and the separation factor ($\alpha_{EtOH}^{H2O}$) was 160.

COMPARATIVE EXAMPLE 2

Polystyrene having a polymerization degree of 1,000 to 1,400 (10 g) was dissolved in carbon tetrachloride (200 ml) at 60° C. for 1 hour. Then, the solution was placed in a four necked flask and conc. sulfuric acid (30 ml) was added to the flask under nitrogen atmosphere. The mixture was reacted at 60° C. for 4 hours. The reaction mixture was added to dehydrated ether to form a white precipitate. To the precipitate was added carbon tetrachloride to dissolve the precipitate. The solution was further added to dehydrated ether to form a precipitate. This procedure was repeated four times to purify the reaction product. The reaction product was confirmed as polystyrene sulfonic acid by its infrared absorption spectrum. To the polystyrene sulfonic acid thus obtained (1.2 g) were added polyvinyl alcohol having a polymerization degree of 2,000 (1.8 g), ethanol (1.4 g) and water (24 g) and the mixture was dissolved at 80° C. The solution was applied on an ultrafiltration membrane composed of polyacrylonitrile with a spin coating machine (800 r.p.m.). The coated membrane was dried at 40° C. for 1 hour and then subjected to heat treatment at 120° C. for 2 hours to effect crosslinking. The pervaporation ability in aqueous 95% (w/w) ethanol solution of the membrane thus obtained was such that the permeation rate was $3.8 \times 10^{-2}$ kg/m²·hr and the separation factor ($\alpha_{EtOH}^{H2O}$) was 97.

EXAMPLE 1

Polystyrene having a polymerization degree of 1,000 to 1,400 (10 g) was dissolved in carbon tetrachloride (200 ml) at 60° C. for 1 hour. Then, the solution was placed in a four necked flask and conc. sulfuric acid (30 ml) was added to the flask under nitrogen atmosphere. The mixture was reacted at 60° C. for 4 hours. The reaction mixture was added to dehydrated ether and to form a white precipitate. To the precipitate was added carbon tetrachloride to dissolve the precipitate. The solution was further added to dehydrated ether to form a precipitate. This procedure was repeated four times to purify the reaction product. The reaction product was confirmed as polystyrene sulfonic acid by its infrared absorption spectrum. To the polystyrene sulfonic acid thus obtained (1.2 g) were added polyvinyl alcohol having a polymerization degree of 2,000 (1.8 g), ethanol (14 g) and water (24 g) and the mixture was dissolved at 80° C. The solution was applied on an ultrafiltration membrane composed of polyacrylonitrile by a spin coating machine (800 r.p.m.). The coated membrane was dried at 40° C. for 1 hour and then subjected to heat treatment at 120° C. for 2 hours to effect crosslinking.

The membrane was soaked in an aqueous ethanol solution for 1 hour, aqueous 0.1 N NaOH solution for 1 hour, 0.1 N NaCl solution for 1 hour and then the ethanol solution for 1 hour and was dried at room temperature.

The pervaporation ability of the membrane obtained is shown in Table 1.

TABLE 1

| Run No. | Ethanol conc. (wt %) | Temp. (°C.) | Permeation rate (kg/m² · hr) | Separation factor H₂O ($\alpha_{EtOH}$) |
|---|---|---|---|---|
| 1 | 90 | 60 | 0.34 | 1500 |
| 2 | 95 | 60 | 0.14 | 1430 |
| 3 | 99 | 60 | 0.03 | 990 |
| 4 | 95 | 75 | 0.23 | 950 |

EXAMPLE 2

Sodium poly-p-styrene sulfonate (10 g) was dissolved in water (100 ml). To the solution was added H⁺ type cation exchange resin (Amberlite IR-120B) (25 ml) and the mixture was stirred for 1 hour. By this procedure, the sodium poly-p-styrene sulfonate was converted into poly-p-styrene sulfonic acid.

The ion exchange resin was filtered off and to the filtrate (50 ml) were added polyvinyl alcohol (4.2 g) and water (50 g). The solution was applied on a polyacrylonitrile ultrafiltration membrane by a bar coating machine. The coated ultrafiltration membrane was dried at 40° C. for 1 hour and subjected to heat treatment at 120° C. for 2 hours to effect intermolecular crosslinking. The pervaporation ability of this membrane is shown in Table 2.

TABLE 2

| Run No. | Ethanol conc. (wt %) | Temp. (°C.) | Permeation rate (kg/m² · hr) | Separation factor H₂O ($\alpha_{EtOH}$) |
|---|---|---|---|---|
| 5 | 50 | 60 | 40 | 26 |
| 6 | 75 | 60 | 0.25 | 49 |
| 7 | 95 | 60 | 0.03 | 500 |
| 8 | 95 | 40 | 0.23 | 1290 |
| 9 | 99 | 40 | 0.01 | 710 |

EXAMPLE 3

The membrane obtained in Comparative Example 1 was soaked in an aqueous ethanol solution for 1 hour, 0.1 N KOH solution or 0.1 N CsOH solution for 3 hours and then the ethanol solution for 1 hour and was dried at room temperature. The pervaporation ability of this membrane is shown in Table 3.

TABLE 3

| Run No. | Base | Ethanol conc. (wt %) | Temp. (°C.) | Permeation rate (kg/m² · hr) | Separation factor H₂O ($\alpha_{EtOH}$) |
|---|---|---|---|---|---|
| 10 | KOH | 95 | 60 | 0.16 | 840 |
| 11 | CsOH | 95 | 60 | 0.13 | 630 |

EXAMPLE 4

According to the same manner as described in Example 1, a separation membrane was prepared except that the mixing ratio (weight ratio) of polyvinyl alcohol and polystyrene sulfonic acid, and the total weight % (solids content) of polystyrene sulfonic acid and polyvinyl alcohol were varied. The pervaporation ability of the membrane prepared is shown in Table 4. The pervaporation ability was determined by feeding aqueous 95% (w/w) ethanol solution at 60° C.

TABLE 4

| Run No. | Solids content (wt %) | Mixing* ratio (wt ratio) | Permeation rate (kg/m² · hr) | Separation factor H₂O ($\alpha_{EtOH}$) |
|---|---|---|---|---|
| 12 | 7.5 | 2.0/1.0 | 0.10 | 970 |
| 13 | 7.5 | 1.5/1.0 | 0.13 | 1070 |
| 14 | 7.5 | 1.0/1.0 | 0.13 | 360 |
| 15 | 5.0 | 1.5/1.0 | 0.10 | 190 |
| 16 | 3.7 | 1.5/1.0 | 0.11 | 140 |

*polyvinyl alcohol/polystyrene sulfonic acid

EXAMPLE 5

To polystyrene sulfonic acid (1.2 g) were added polyvinyl alcohol having a polymerization degree of (1.8 g), ethanol (14 g) and water (24 g) and the mixture was dissolved at 80° C. The solution was applied on a glass plate and dried at 40° C. for 1 hour to prepare a membrane. The infrared absorption spectrum of this membrane is shown in FIG. 1.

Figure 2:
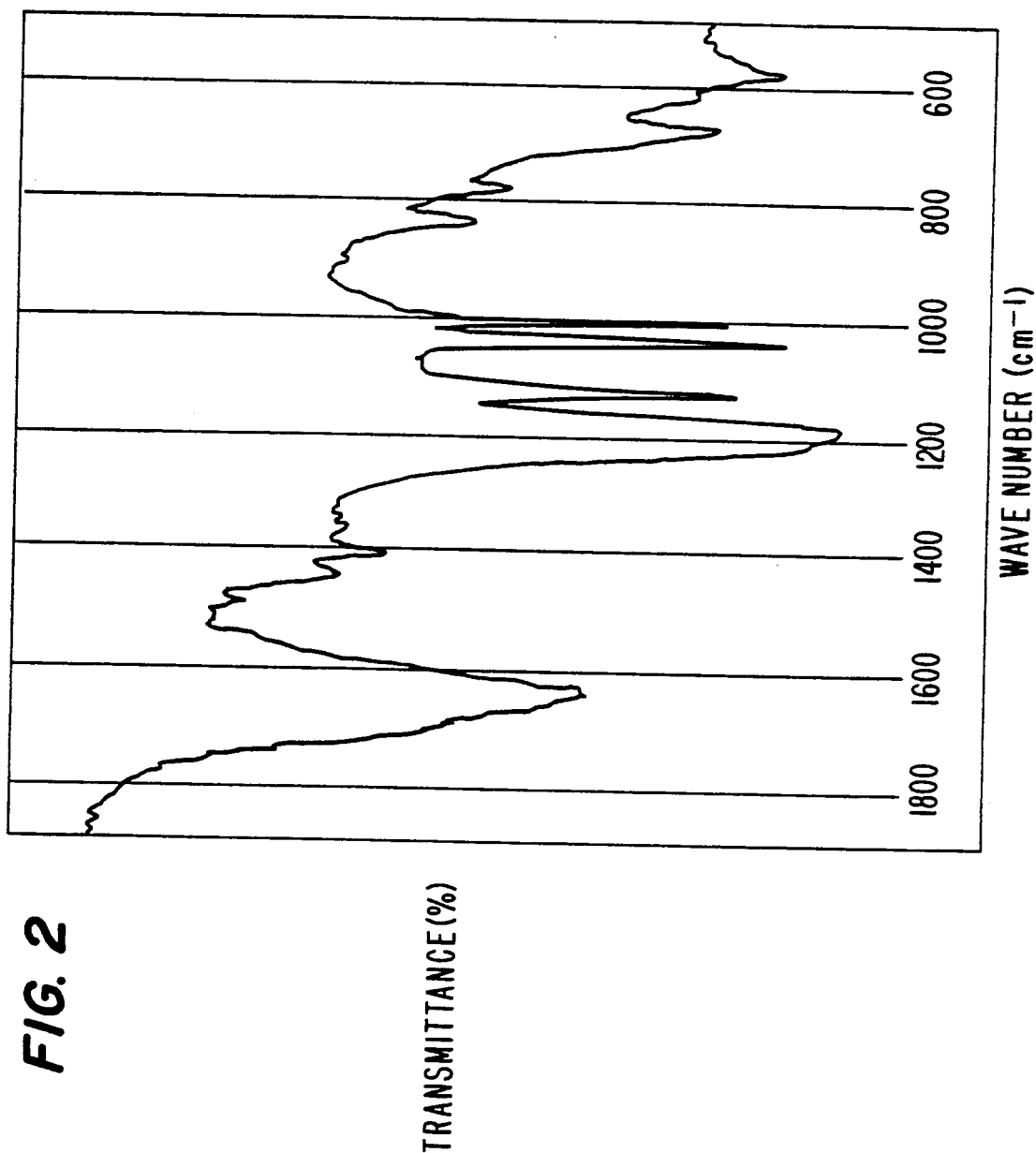
FIG. 2 is an infrared absorption spectrum of the separation membrane of FIG. 1 after subjecting it to heat treatment at 120° C. for 2 hours to effect crosslinking.

Further, the membrane was subjected to heat treatment at 120° C. for 2 hours. The infrared absorption spectrum of this membrane is shown in FIG. 2.

As shown by these drawings, absorption bands at 1180 cm⁻¹ and 1450 cm⁻¹ are newly appeared by heat treatment at 120° C. for 2 hours. These absorption bands are corresponding to R—O—SO₂—R formed by the crosslinking reaction of the polyvinyl alcohol and polystyrene sulfonic acid, and become more intense by heating for a longer time.

What is claimed is:

1. A separation membrane for pervaporation which comprises an intermolecular crosslinked reaction product of a mixture consisting essentially of a polyvinyl alcohol or polyvinyl alcohol copolymer and a polystyrene sulfonic acid or polystyrene sulfonic acid copolymer.

2. A membrane according to claim 1, wherein the sulfonic acid in the crosslinked reaction product is introduced in the form of a sulfonate group.

3. A membrane according to claim 2, wherein the sulfonate is an alkali metal sulfonate.

4. A membrane according to claim 1, wherein the membrane is obtained by applying a mixture of polyvinyl alcohol and polystyrene sulfonic acid on a porous supporting material and then subjecting the mixture to a crosslinking treatment.

5. A membrane according to claim 4, wherein the mixing ratio of polyvinyl alcohol and polystyrene sulfonic acid is in the range of 1.5 to 5.0 parts by weight of polyvinyl alcohol per 1 part by weight of polystyrene sulfonic acid.

6. A membrane according to claim 4, wherein the crosslinking treatment is effected by heating at 100° to 150° C.

7. A membrane according to claim 4, wherein the porous supporting material is an ultrafiltration membrane.

8. A membrane according to claim 4, wherein the porous supporting material is made of polyacrylonitrile copolymer.

9. A method for separating a mixture of water and an organic compound which comprises the steps of
 (a) contacting one side of a separation membrane for pervaporation comprising an intermolecular crosslinked reaction product of a mixture consisting essentially of a polyvinyl alcohol or polyvinyl alcohol copolymer and a polystyrene sulfonic acid or polystyrene sulfonic acid copolymer with a liquid feed mixture containing water and at least one organic compound; and
 (b) withdrawing from the other side of said membrane a permeate in a vapor state, said permeate containing water vapor in a concentration higher than that in the feed mixture.

10. A method according to claim 9, wherein the organic compound is an aliphatic alcohol.

11. A method according to claim 10, wherein the aliphatic alcohol is ethanol.

12. A method according to claim 9, wherein the permeate contains at least 80% by weight of water.

13. A method according to claim 9, wherein the sulfonic acid contained in the crosslinked product is in the form of a sulfonate.

14. A method according to claim 13, wherein the sulfonate is an alkali metal sulfonate.

15. A membrane according to claim 7, wherein the porous supporting material is made of polyacrylonitrile copolymer.

* * * * *